July 4, 1939.     J. SURIS     2,165,185
VEHICLE WHEEL
Filed Jan. 14, 1938
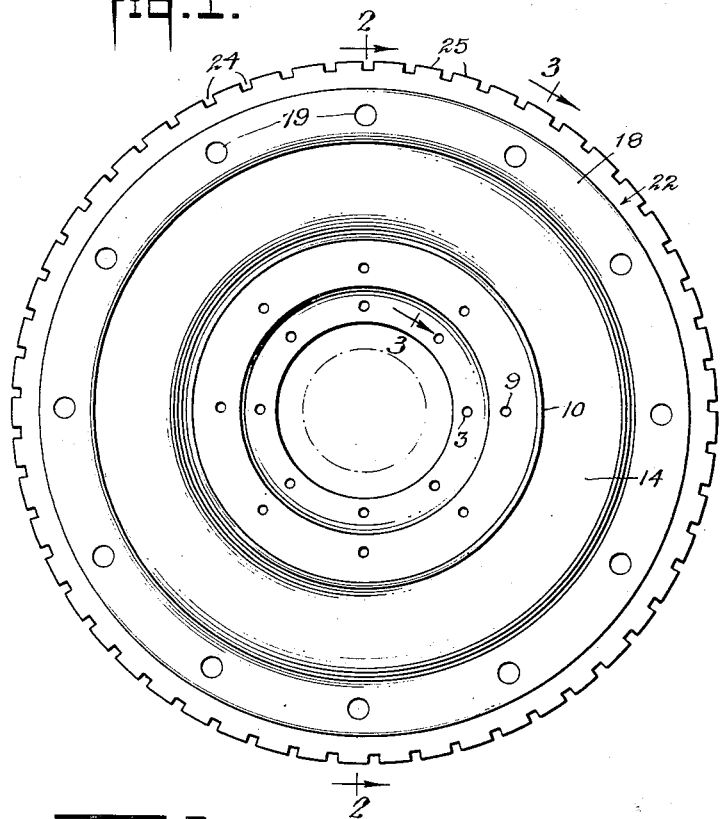
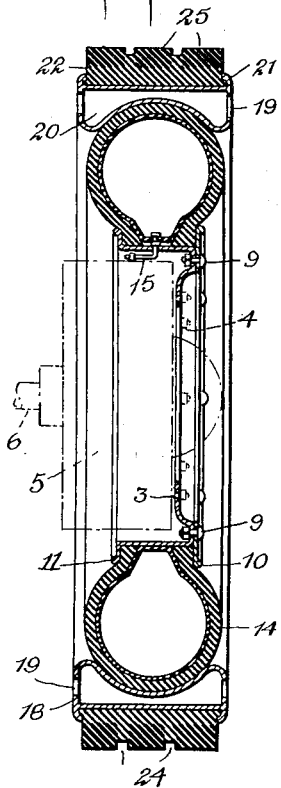
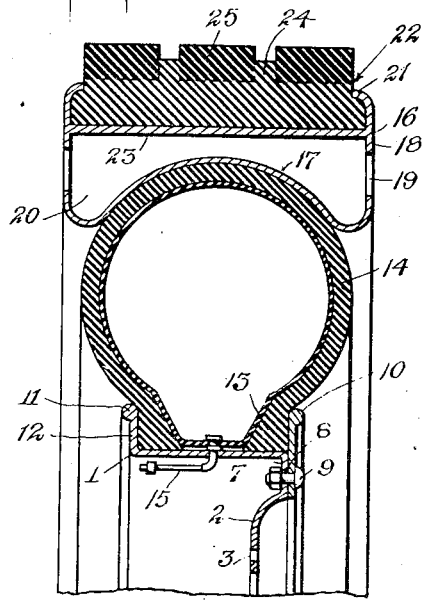
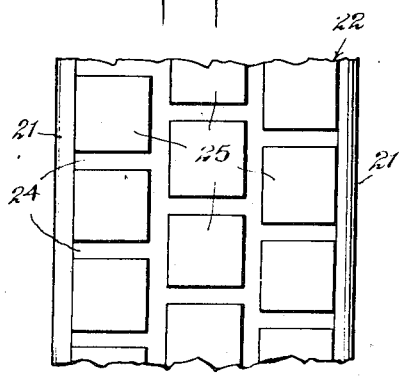
INVENTOR
Jose Suris
BY
Munn Anderson + Liddy
ATTORNEYS Patented July 4, 1939

2,165,185

UNITED STATES PATENT OFFICE 2,165,185

VEHICLE WHEEL

José Suris, Habana, Cuba

Application January 14, 1938, Serial No. 184,959
In Cuba October 13, 1937

1 Claim. (Cl. 152—56)

This invention relates to vehicle wheels and particularly to a wheel for automobiles, an object being to provide a construction which will give the usual resilient cushion effect of pneumatic tires and, at the same time, presents a long wearing surface without any parts being puncturable.

Another object is to provide a wheel for a vehicle wherein an inner pneumatic tire structure is utilized and an outer solid rubber tire structure is provided, the parts being so arranged that the outer tire structure takes care of the wear while the inner tire structure presents a cushion or resilient support.

An additional object is to provide an improved automobile wheel which uses a solid tire as well as a pneumatic tire, with the parts so arranged that the respective tires may be removed for repair or replacement with comparative ease.

In the accompanying drawing—

Fig. 1 is a side view of a wheel disclosing an embodiment of the invention;

Fig. 2 is a sectional view through Fig. 1 approximately on the line 2—2 of Fig. 1;

Fig. 3 is an enlarged sectional view through Fig. 1 approximately on the line 3—3;

Fig. 4 is a plan view on an enlarged scale of a short section of the tread surface of the outer tire shown in Figs. 1 and 2.

Referring to the accompanying drawing by numerals, 1 indicates a primary or inner rim which is substantially Z-shaped in cross section, with one leg of the Z provided with an annular depending web 2 having a number of apertures 3 for receiving the various bolts 4 when the wheel is bolted to the hub 5 connected with the automobile on which the wheel is to be used. Ordinarily, the hub 5 is connected in any suitable manner with a shaft 6 or other support whereby the strain from the automobile will be transmitted to the wheel. As shown in Fig. 3, the leg 7 of member 1 is provided with an aperture 8 for the reception of a bolt 9, which bolt extends also through the ring 10. The ring 10 is provided with a rounded upper edge similar to the rounded upper edge 11 of the leg 12. By this arrangement the base 13 of the pneumatic tire 14 is held properly in place on the rim 1. A suitable valve structure 15 is provided whereby the tire may be inflated at any time. The tire 14 may be an ordinary standard pneumatic tire and, consequently, will give the usual resilient air cushion effect.

If the tire 14 were used as the ordinary tires are used the same might become punctured from time to time. By the present construction the tire 14 cannot become punctured because there is provided an outer or auxiliary rim 16 which rests on the peripheral part of the tire 14. The rim 16 is provided with a central inner portion 17 which is arc-shaped in cross section so as to properly fit against the outer peripheral part of the tire 14, as shown in Fig. 3. The sides of the portion 17 merge into upstanding side plates or portions 18 provided with suitable ventilating apertures 19 so as to ventilate the chamber or space 20. At the outer edge the plates 18 are each provided with a turned-over gripping portion 21 which is adapted to overlap the respective edges of the solid tires 22 which rests on the ring 23. The ring 23 may be formed integral with the upstanding members 18 or welded rigidly thereto. The auxiliary tire 22 is preferably made from soft solid rubber 24 having blocks 25 of rubber merging therein. Preferably the blocks of rubber 25 are heavier and slightly less resilient than the solid rubber body 24. This provides a good wearing surface and by reason of the fact that the blocks 25 are spaced apart the tire will readily and efficiently grip the roadway when the wheel is in use.

The material of which the inner portion 17 and associated parts are made is adapted to be somewhat resilient and is preferably steel or similar resilient metal. By making the auxiliary rim 16 of flexible resilient steel, the cushion effect of the air in the tire 14 is maintained but tire 14 is not subject to being punctured.

When the parts are in the position shown in Fig. 2, the tire is ready for use. By removing the nuts from bolts 4 the wheel may be readily removed and if it is desired to remove the auxiliary rim 16, the tire 14 is deflated to a certain extent and then the rim may be readily removed. If it should be desired to remove the tire 14, bolts 9 are removed and this will release the ring 10. Tire 14 may then be readily slid off the rim 1 by a movement to the right as illustrated in Fig. 3. A reverse action produces an assemblage of the respective parts. The tire 14 is reassembled to the position shown in Fig. 3 while in a deflated condition. The resilient rim 16 is then slipped into position substantially as shown in Fig. 3, and then the tire 14 is inflated until the peripheral part presses tightly against the portion 17. The wheel is then in condition for use and will readily take up various jolts, jars, and strains without materially affecting the vehicle to which it is connected. Also by reason of the fact that the rather stiff and hard rubber blocks 25 will engage the roadbed, very little wear will be produced and, consequently, the wheel will last for an indefinite time.

If the tire 22 should wear to such an extent as to need a new tire, a workman can readily remove the old tire and place a new one in position. This may be done in several ways, as for instance by straightening out or unbending the curved edge 21. During the wear on the outer tire there is substantially no wear on the inner tire 14 and, consequently, it will wear for an indefinite time.

It will be understood that the particular make of tire 14 may be varied without departing from the spirit of the invention, and also the particular make of the tire 22 may be varied but it is always preferable to have a solid tire structure where tire 22 is located and a pneumatic structure where tire 14 is located.

I claim:

In a wheel having a primary rim and a pneumatic tire mounted on said rim, an auxiliary rim being formed of metal and provided with a portion arc-shaped in cross section fitting against said tire, side apertured portions upstanding from said arc-shaped portion, a tire-supporting band carried by said side portions intermediate their radial height, a solid rubber tire mounted on said tire-supporting band, and inwardly extending flanges carried by said upstanding portions overlapping part of said solid rubber tire for clamping the tire in place.

JOSE SURIS.